Aug. 14, 1928.
W. H. SAUVAGE
1,681,054
FOUNDATION BRAKE RIGGING
Filed Aug. 17, 1927
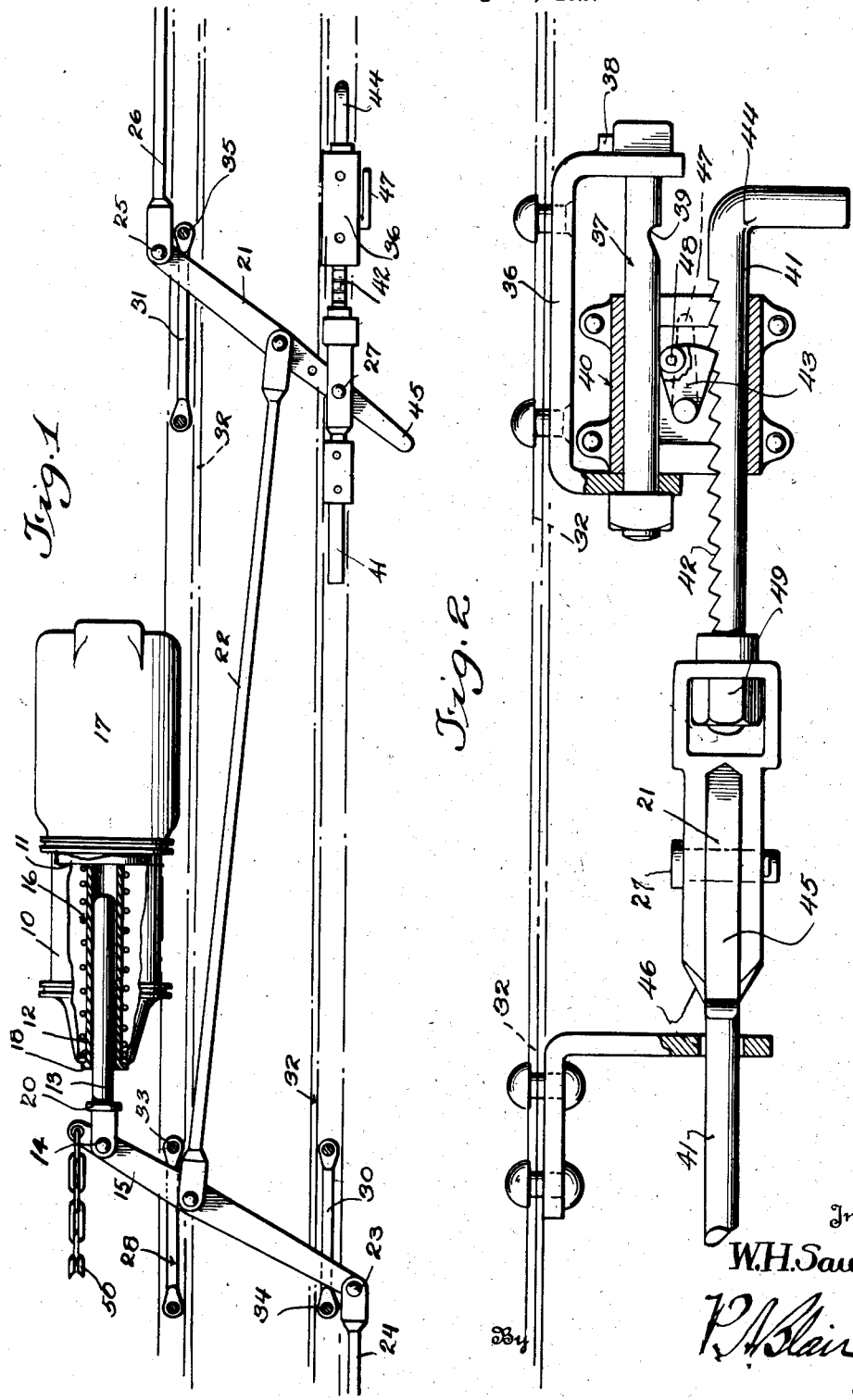
Inventor
W. H. Sauvage
Attorney Patented Aug. 14, 1928.

1,681,054

UNITED STATES PATENT OFFICE.

WILLIAM H. SAUVAGE, OF NEW YORK, N. Y., ASSIGNOR, BY MESNE ASSIGNMENTS, TO ROYAL RAILWAY IMPROVEMENTS CORPORATION, OF NEW YORK, N. Y., A CORPORATION OF DELAWARE.

FOUNDATION BRAKE RIGGING.

Application filed August 17, 1927. Serial No. 213,611.

This invention relates to foundation brake rigging and more particularly to foundation brake rigging adapted for use on airbrake controlled railway vehicles and to manually actuated means for regulating the brake rigging to give predetermined brake shoe clearance, uniform piston travel and maximum efficiency.

One of the objects of the present invention is to provide mechanism of the above general character of simple and practical construction and having relatively few new parts whereby the brake system now in general use may be easily adapted to embody the present invention without material additional expense or equipment.

A further object is to provide an improved foundation brake rigging which will be substantially fool-proof and permit easy and quick manual regulation for the purpose of so positioning the various parts of the foundation brake rigging as to insure uniform piston travel and proper and predetermined brake shoe clearance.

A further object is to provide mechanism of the above general character in which the range of movement under normal conditions of the various working parts is limited to such an extent that while brake application may be obtained at all times, nevertheless there will be insufficient space to permit the insertion or substitution of new shoes for worn shoes without requiring full release of the brake rigging and subsequent adjustment after such substitution, thereby positively preventing the consequent dangers to operation incident thereto.

A further object is to provide a brake rigging of the above general character which will be reliable and efficient in use at all times and which will permit the substantially instantaneous regulation of the entire foundation brake rigging by a single manually actuated movement of one part.

Other objects will be in part obvious and in part hereinafter pointed out in connection with the accompanying drawings wherein is illustrated one of the various possible embodiments of the invention and in the several views of which corresponding parts are denoted by similar reference characters.

In these drawings—
Fig. 1 is a plan view; and
Fig. 2 is a detail elevational view, partly in section.

Referring now more particularly to Fig. 1, 10 indicates an airbrake cylinder provided with a piston 11 and a two-part telescoping piston rod, one part 12 of which is connected with the piston head 11; and the other part 13 extends outwardly thru the end of the cylinder and is pivotally connected at the point 14 with a live cylinder lever 15. A spring 16 surrounds the part 12 and is compressed on outward movement of the piston 11, thereby to restore the parts to normal position after application, when the air pressure is released. There is indicated at 17 the usual air reservoir. It will also be noted that the sleeve 12 has a predetermined travel of approximately three and a half inches before an end collar 18 carried thereby coacts with a collar 20 on the jaw of the piston rod 13. Likewise, the inner end of the telescoping rod 13 is approximately this same distance of three and a half inches from the adjacent wall of the piston head 11. From this, it will be seen that the piston head has a predetermined and insured movement of approximately three and a half inches, or one half the total normal travel of the piston, before any movement whatsoever takes place in the brake rigging. The purpose of this construction will be more apparent from the explanation hereafter following.

Coacting with the live cylinder lever 15 is a dead or floating cylinder lever 21, and extending between these levers is a pull or tie rod 22. The outer end of the lever 15 is pivotally connected at the point 23 to one end of a pull rod 24 leading to the truck brake rigging which is of any usual well known construction, the details and operation of which require no description.

Likewise the floating lever 21 is pivotally connected at point 25 with a pull rod 26 leading to the truck brake rigging at the opposite end of the car. The point 27 of the floating lever 21 may for the purpose of explanation be considered fixed or corresponding to the usual fixed fulcrum point of this lever whereby in operation as the piston moves outwardly, this point will act as a fulcrum against the pull of the tie rod to cause the pull rod 26 to move relatively towards the left until the brake shoes absorb the clearance and engage the peripheries of the wheels of the truck at that end, after which the braking pressure is exerted by a continued movement.

It will be noted particularly that the cylinder levers 15 and 21 are supported from the under side of the car body, as for example by brackets 28, 30 and 31, depending from the under side of the center sills 32 of the car frame. For convenience of manufacture, these brackets are of general U-shaped construction, altho if desired other supporting means may be used, depending upon the general type of car frame to which the rigging is applied. The principal point, however, to be considered is the predetermined size and location of these supporting means with respect to the normal position of rest of the foundation brake rigging, that is, the point 33 of the bracket 28 is adapted to act as a stop to arrest the inward movement of the collar 20 upon the piston rod 13. Also, the point 34 limits the relative outward movement of the pull rod 24, and the two points 33 and 34 together define the normal and correct position of rest of the lever 15. Likewise the point 35 of the bracket 31 limits the movement of the rod 26 towards the right, inasmuch as the point 27 may be considered fixed.

With this explanation of the fundamentals of the brake rigging in mind, attention is now directed to the regulator and associated parts more clearly shown in Fig. 2, these parts being grouped about the point 27 and comprise, for example, a depending inverted U-shaped support 36 permanently secured as by means of rivets, to one of the center sills 32. This support carries a rod 37 which may be in the form of a bolt extending between the ends of the support 36 and provided with a lock means 38 to prevent turning thereof. A notch 39 is cut in the under side as shown. This rod 37 is embraced by the regulator casing 40 preferably formed by two mating castings or drop forgings permanently secured or riveted together, the upper parts of which embrace this rod 37 while the lower parts embrace a rod 41 provided with ratchet teeth 42 on its upper side adapted to be engaged by pawl 43 pivotally mounted between the two parts of the casing 40. This pawl which is of general triangular shape with a rounded upper corner is normally held in locking engagement so long as the parts are in the position shown in Fig. 2, but when this casing is moved relatively towards the right, then the upper corner of the pawl slides or rolls freely along the under side of support 37 until it may move upwardly into notch 39, thereby permitting one or more teeth to slip under the pawl 43 as may be necessary to take up any wear occuring in the brake rigging. This movement of the regulator casing towards the right is accomplished by grasping a handle 44 at the end of the rod 41 or an extension 45 of the lever 21 according to whichever may be more convenient. Particular attention is directed to the fact that the lever 21 passes thru a bifurcated portion 45 of the rod 41 to prevent rotation, and the opposite end of this rod is supported in a bearing member depending from the center sill. The pawl 43 is provided with an outwardly extending handle 47 for the purpose of holding the pawl out of engagement with the ratchet teeth 42 when it is desired to release the entire brake rigging and restore the parts to normal position, as for example when inserting new brake shoes.

It will be noted that the upper part of the pawl 43 is provided with a small roller 48 preferably of bronze or other non-rusting material adapted to engage the under side of the rod 37. This roller is for the purpose of reducing the friction between the rod 37 and the pawl when the ratchet rod is pulled towards the right. Heretofore, it has been found that there was a tendency for the pawl to bind in its engagement with the under side of this carrier rod, and the use of a roller at this point materially reduces the friction and permits surer and easier operation.

While not absolutely necessary, but perhaps highly desirable, the adjusting rod 41 is preferably made in two parts having a swivel connection 49 substantially as shown in Fig. 2, thereby to permit a relative turning of one part of this adjusting rod with respect to the bifurcated portion 46 which is held against turning by reason of its coaction with the floating lever 21. When this swivel connection is used, the handle 47 to the holding pawl, which is an expensive commercial detail, may be omitted, and the pawl 43 will be thrown out of cooperation with the ratchet by merely turning the handle 44 of the adjusting rod thru an angle of 90°. This turning movement, of course, allows the adjusting rod to be forced inwardly to its full release position as required when inserting new brake shoes.

While the truck brake rigging and hand brake rigging have not been illustrated or described inasmuch as they form no part of the present invention except in so far as they may enter in the combinations hereinafter described, it may be remarked that any type of truck brake rigging and also any type of hand brake rigging may be used. The latter, indicated at 50, of course, would be connected preferably to the piston rod 13 at or near the point 14, thereby to cause a relative movement of the piston rod jaw towards the left in applying the brakes by hand without in any way disturbing the relative position of the piston 11.

While it is believed that the operation and advantages of the construction above set forth will be clear from this description, it is desired to point out, however, that in operation or regulation of the foundation brake gear, it is only necessary for the inspector to take hold of either the handle 44 or extension handle 45 of the floating lever and move the same relatively toward the right the full limit of travel permitted by reason of the difference in length of the regulator casing 40 and the support 36, this difference being approximately five inches and proportional to the total normal brake shoe clearance at this point.

If, by reason of any lost motion existing in the foundation brake gear either by wear on the gear itself but more generally wear of the brake shoes, further movement of the adjusting or take up rod 41 is permitted, then the pawl 43 will slip over one or more teeth 42 depending upon this excess travel. This regulating movement, of course, brings the brake shoes into close engagement with the peripheries of the wheels at both ends of the car, causing a relative movement of the pull rod 26 towards the left and the pull rod 24 towards the right, but effects no movement whatsoever of the point 14 of the piston rod jaw, this movement being prevented by reason of the stop 33 of the bracket 28. In other words, the approximate five inch travel permitted the regulating box 40 is proportional to the total brake shoe clearance movement of the brake shoes at both ends of the car.

On release of the operating handle 44 or 45, the brake rigging returns to normal position of rest either by the action of springs or gravity according to the type of truck brake rigging employed, and the regulator casing moves back to the left end of its support, thereby locking the pawl in engaged position and thus insuring predetermined and proper brake shoe clearance and piston travel at all points.

When it is desired to insert new brake shoes as frequently occurs, the inspector actuates the regulating handles as above described and lifts or holds up the pawl in engagement with the notch 39, thereby permitting the regulating rod 41 to be moved bodily towards the left to its full original release position. This causes the brake beams to drop clear to their normal position allowing sufficient space for the insertion of the new brake shoes without having to drive them into place. When the shoes have been applied, all of the brakes may be simultaneously and substantially instantaneously regulated to cause proper brake shoe clearance and piston travel by repeating the regulating operation, above described.

By reason of the stop 33, the effective piston travel is limited to approximately seven inches. This proportional distance at this point allows insufficient clearance at any truck brake shoe point whereby a new brake shoe could be jammed into the small space existing between the wheel and the brake beam head, thus positively eliminating a careless or inexperienced workman from doing this very thing which so often causes tight and dragging brakes with the consequent danger to operation and equipment.

Were it not for the lever carriers 28, 30 and 31 and their accurate positioning with respect to the normal travel and which define the positions of rest of the various working parts, it will be apparent that the regulating movement above described would disturb the angularity of the various moving parts of the brake rigging to such an extent that shortly the levers would never occupy a position such as to permit the natural release of the brakes when the piston returned to normal position, but the stops 33, 34, are so positioned that when the parts are properly regulated, the desired brake shoe clearance will exist at each brake shoe and the levers of both trucks will be in proper and equal angularity with respect to the rest of the rigging.

From the above it will be seen that the present invention provides a reliable and efficient regulator for the foundation brake gear of railway cars and more particularly one which may be applied at a minimum expense due to its simplicity and the utilization of standard equipment now in general use. The apparatus not only insures uniform piston travel but also uniform and predetermined brake shoe clearance at all times, both of which points are of the utmost importance in efficient railway brake equipment, thereby differing from so-called automatic slack adjusters which, due to variations in forms of brake applications, tend to creep and shortly develop short piston travel and dragging brakes.

I claim:

1. In a foundation brake rigging of the character described, in combination, an air-brake cylinder, cylinder levers, a piston movable within the cylinder and connected with one of the levers, and a single manually actuated member on the car frame and connected with one of the cylinder levers and acting as a fulcrum therefor but capable of relative free movement in one direction an amount proportional to brake shoe clearance of both trucks, as well as an additional movement for the purpose of permanently taking up and holding any excess movement of the brake shoes of both of the trucks beyond their predetermined clearance travel.

2. In a foundation brake rigging of the character described, in combination, a cylinder, a piston with a telescoping piston rod associated therewith, one of the parts of which has a normal operative movement in excess of the other part, cylinder levers adapted to be actuated thereby, and a single manually operable regulating device separated from said cylinder and associated with one of said levers adapted to substantially instantaneously obtain proper and predetermined brake shoe clearance at a single operation.

3. In a foundation brake rigging of the character described, in combination, an airbrake cylinder having a piston, a two part telescopic piston rod, one of which parts has a greater range of movement than the other during brake application, cylinder levers actuated by said piston, a single manually actuated regulating device mounted on the car body connected with one of said levers for insuring proper brake shoe clearance, and means adapted to prevent a movement of the piston when said regulating device is actuated.

4. In a foundation brake rigging of the character described, in combination, an airbrake cylinder having a piston, a two part relatively movable piston rod, one of which parts has a greater range of movement than the other during brake application, cylinder levers actuated by said piston, a single manually actuated regulating device mounted on the car frame connected with one of said levers for insuring proper brake shoe clearance, and means adapted to prevent a movement of the piston when said regulator is actuated, said means including a stop adapted to resist movement of the end of the cylinder lever adjacent the piston in the direction of movement of the regulator.

5. In a foundation brake rigging of the character described, in combination, a cylinder with a piston therein, a two part telescoping piston rod, a cylinder lever connected with said piston rod, two coacting stop devices adapted to define the normal position of rest of said lever, a second cylinder lever, and a manually actuated regulator mounted on the car body associated with said second lever which when actuated will obtain proper brake shoe clearance simultaneously upon both trucks.

6. In a foundation brake rigging of the character described, in combination, an airbrake cylinder having a piston and a two part telescoping piston rod, a live cylinder lever connected with said rod, means for positively defining the normal position of rest of said rod, a floating cylinder lever, a rod connecting said cylinder levers, and stop means for positively defining the normal position of rest of said levers, a regulator mounted on the car frame associated with one lever, said regulator adapted to be manually actuated and including permanent take up and holding means whereby a single actuating movement of the regulator will permanently take up and hold any excess travel of the brake shoes over and above proper brake shoe clearance.

7. In a foundation brake rigging of the character described, in combination, an airbrake cylinder having a piston and a two part telescoping piston rod, a live cylinder lever connected with said rod, means for positively defining the normal position of rest of said rod, a floating cylinder lever, a rod connecting said cylinder levers, and stop means for positively defining the normal position of rest of said levers, a regulator mounted on the car frame associated with one lever, said regulator adapted to be manually actuated and including permanent take up and holding means whereby a single actuating movement of the regulator will permanently take up and hold any excess travel of the brake shoes over and above proper brake shoe clearance, said actuating movement being in excess of the movement of one of the parts of said airbrake piston.

8. In a foundation brake rigging of the character described, in combination, an airbrake cylinder having a piston and a two part telescoping piston rod, a live cylinder lever connected with said rod, means for positively defining the normal position of rest of said rod, a floating cylinder lever, a rod connecting said cylinder levers, and stop means for positively defining the normal position of rest of said levers, a regulator mounted on the car frame associated with one lever, said regulator adapted to be manually actuated and including permanent take up and holding means whereby a single actuating movement of the regulator will permanently take up and hold any excess travel of the brake shoes over and above proper brake shoe clearance, said regulator having a free movement proportionally equal to the desired brake shoe clearance of the brake shoes of both trucks.

9. In a foundation brake rigging of the character described, in combination, an airbrake cylinder having a piston, a two part telescoping piston rod, one of which parts has substantially twice the movement of the other part during normal brake application movement, a cylinder lever connected with one of the parts of said piston, and stop means for defining and limiting its return movement to normal position of rest, a floating lever disconnected from said cylinder but connected with said first lever having a normally relatively fixed point near one end, and stop means coacting with the other end adapted to limit its range of movement in one direction, said relatively fixed point comprising a regulator whereby the truck brake rigging of both trucks may be substantially simultaneously and instantaneously regulated to proper brake shoe clearance.

10. In a foundation brake rigging of the character described, in combination, an air-brake cylinder having a piston, a two part telescoping piston rod, one of which parts has substantially twice the movement of the other part during normal brake application movement, a cylinder lever connected with one of the parts of said piston, and stop means for defining and limiting its return movement to normal position of rest, a floating lever disconnected from said cylinder but connected with said first lever having a normally relatively fixed point near one end, and stop means coacting with the other end adapted to limit its range of movement in one direction, said relatively fixed point comprising a regulator including a housing having a normal regulating movement proportional to total brake shoe clearance, and a permanent take up and holding mechanism within said housing for retaining any movement of the brake shoes over and above predetermined clearance.

11. In a foundation brake rigging of the character described, in combination, an air-brake cylinder having a piston, a two part telescoping piston rod, one of which parts has substantially twice the movement of the other part during normal brake application movement, a cylinder lever connected with one of the parts of said piston, stop means for defining and limiting its return movement to normal position of rest, a floating lever disconnected from said cylinder but connected with said first lever having a relatively fixed point near one end, and stop means coacting with the other end adapted to limit its range of movement in one direction, said relatively fixed point comprising a regulator including a housing having a normal regulating movement proportional to total brake shoe clearance, and a permanent take up and holding mechanism within said housing for retaining any movement of the brake shoes over and above predetermined clearance, said last means including an anti-friction pawl and a ratchet with which it coacts.

12. In a foundation brake rigging of the character described, in combination, an air-brake cylinder having a piston, a two part telescoping piston rod, one of which parts has substantially twice the movement of the other part during normal brake application movement, a cylinder lever connected with one of the parts of said piston, stop means for defining and limiting its return movement to normal position of rest, a floating lever disconnected from said cylinder but connected with said first lever having a relatively fixed point near one end, and stop means coacting with the other end adapted to limit its range of movement in one direction, said relatively fixed point comprising a regulator including a housing having a normal regulating movement proportional to total brake shoe clearance, a permanent take up and holding mechanism within said housing for retaining any movement of the brake shoes over and above predetermined clearance, said last means including an anti-friction pawl and ratchet with which it coacts, and means whereby said pawl and ratchet mechanism may be disconnected for the purpose of restoring the parts to full initial release position as when new brake shoes are to be applied.

13. In a foundation brake rigging of the character described, in combination, an air-brake cylinder having a piston and a two part telescoping piston rod, a live cylinder lever connected with said rod, stop means for positively defining its normal position of rest, a floating cylinder lever, a rod connecting said cylinder levers, stop means positively defining the normal position of rest of said floating lever, a regulator adapted to be manually actuated and including permanent take up and holding means whereby a single actuating movement of the regulator will permanently take up and hold any excess travel of the brake shoes over and above proper brake shoe clearance, said regulator mounted on the car frame having a free movement proportional to the desired brake shoe clearance of the brake shoes of both trucks, said regulator including a longitudinally movable rod slotted to receive said second lever, and pawl and ratchet mechanism associated with said rod for permanently taking up and holding any excess movement of said rod thereby to insure predetermined brake shoe clearance.

14. In a foundation brake rigging of the character described, in combination, an air-brake cylinder having a piston and a two part telescoping piston rod, a live cylinder lever connected with said rod, stop means for positively defining its normal position of rest, a floating cylinder lever, a rod connecting said cylinder levers, stop means positively defining the normal position of rest of said floating lever, a regulator mounted on the car frame adapted to be manually actuated and including permanent take up and holding means whereby a single actuating movement of the regulator will permanently take up and hold any excess travel of the brake shoes over and above proper brake shoe clearance, said regulator having a free movement proportional to the desired brake shoe clearance of the brake shoes of both trucks, said regulator including a longitudinally movable rod slotted to receive said second lever, pawl and ratchet mechaism associated with said rod for permanently taking up and holding any excess movement of said rod thereby to insure predetermined brake shoe clearance, and means for disconnecting said pawl and ratchet mechanism whereby said rod may be moved to full initial release position.

15. In a foundation brake rigging of the character described, in combination, an airbrake cylinder having a piston, a two part telescoping piston rod, one of which parts has substantially twice the movement of the other part during normal brake application movement, a cylinder lever connected with one of the parts of said piston, stop means for defining and limiting its return movement to normal position of rest, a floating lever disconnected from said cylinder but connected with said first lever having a relatively fixed point near one end, and stop means coacting with the other end adapted to limit its range of movement in one direction, said relatively fixed point comprising a regulator including a housing having a normal regulating movement proportional to total brake shoe clearance, a permanent take up and holding mechanism within said housing for retaining any movement of the brake shoes over and above predetermined clearance, said last means including an anti-friction pawl and ratchet with which it co-acts, and means whereby said pawl and ratchet mechanism may be disconnected for the purpose of restoring the parts to full initial release position as when new brake shoes are to be applied, said ratchet having a swivel connection permitting it to be turned out of engagement with said pawl.

Signed at New York, New York, this 20th day of June, 1927.

WILLIAM H. SAUVAGE.